Aug. 7, 1945.   L. C. HUFF   2,381,168
PROCESS WHEREIN FLUID HYDROCARBONS ARE CONTACTED AND
MIXED WITH ACIDIC FLUID IN A CONFINED ZONE
Original Filed May 25, 1943
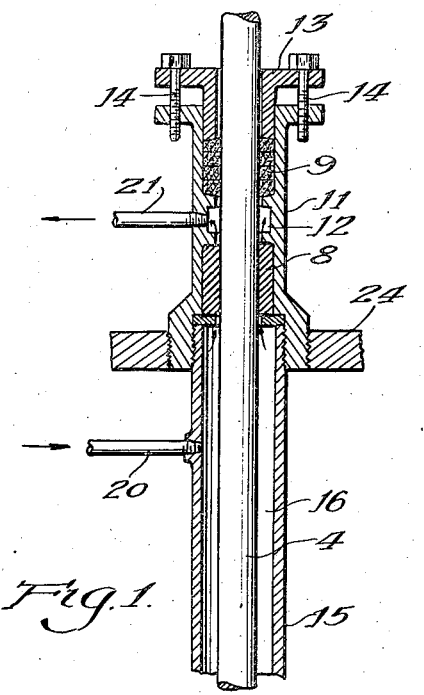
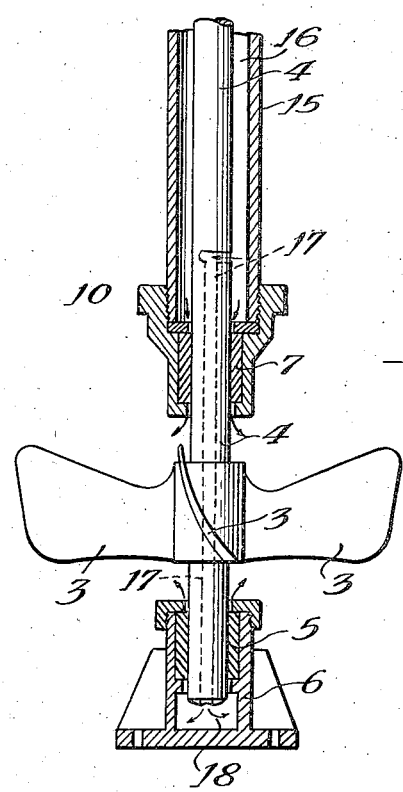
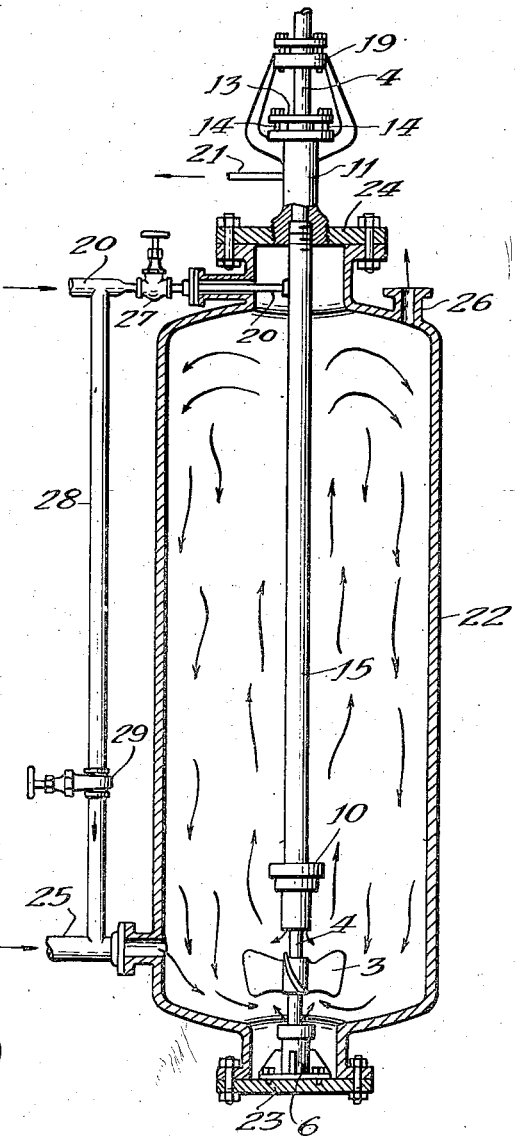
Inventor:
Lyman C. Huff,
By: Lee J. Gary
Attorney.

Patented Aug. 7, 1945

2,381,168

UNITED STATES PATENT OFFICE 2,381,168

PROCESS WHEREIN FLUID HYDROCARBONS ARE CONTACTED AND MIXED WITH ACIDIC FLUID IN A CONFINED ZONE

Lyman C. Huff, Chicago, Ill., assignor to Universal Oil Products Company, Chicago, Ill., a corporation of Delaware Original application May 25, 1942, Serial No. 444,328. Divided and this application September 20, 1943, Serial No. 503,053

5 Claims. (Cl. 260—683.4)

This is a division of my co-pending application which has issued as Patent No. 2,347,195, April 25, 1944.

The invention relates to an improved method of obtaining mixing or intimate contact between two or more fluids.

The invention will be found useful and advantageous in a wide variety of chemical processes and in its broader aspects is not limited to use in any specific chemical reaction but is directed broadly to operations involving mixing or intimate contacting of fluids in a confined zone. However, the features of the invention are particularly advantageous as applied to handling hot and/or corrosive fluids at high pressure. I therefore specifically contemplate the use of my invention in conducting chemical processes employing elevated temperatures and/or pressures and in which one or more of the fluids to be commingled is hot or corrosive or both and functions either as a treating or refining agent or as one of the reactants, or as a catalyst or similar agent for promoting the desired reaction or for retarding undesired side reactions.

The now well known process of alkylating saturated with unsaturated hydrocarbons employing alkylating agents, such as sulfuric acid, phosphoric acid, hydrogen fluoride or aluminum chloride, is a good example of one of the many processes in which the features of the invention may be employed to advantage.

Another such example is found in any of a wide variety of so-called "treating" processes employed for removing undesirable components from cracked distillates and other hydrocarbons or for retarding the detrimental effect of such materials. Processes of this class employ various reagents of a corrosive nature, such as sulfuric acid, hydrogen chloride, caustic soda, plumbite, copper chloride and other metal salts and the like and the features of the invention are particularly advantageous as applied to such operations.

The features and advantages of the invention will be apparent with reference to the accompanying diagrammatic drawing and the following description thereof.

Figure 1 of the drawing is an elevational view, shown principally in longitudinal section, of one specific form of mixing device which permits the use of features provided by the invention.

Figure 2 illustrates the device of Figure 1 disposed within a closed vessel, such as a reactor. The reaction vessel is shown in longitudinal section and is provided with suitable inlet and outlet conduits for the fluid reactants and the reaction products.

Referring to the drawing and particularly to Figure 1, the apparatus here illustrated comprises an impeller 3 mounted on and adjacent one end of a rotatable shaft 4 which extends downwardly from the impeller through a bearing 5 disposed in a housing or case 6 and extends upwardly from the impeller through bearings 7 and 8 and a packing gland containing suitable packing material 9. A housing 10 is provided for the bearing 7 and, in the case illustrated, bearing 8 and packing 9 are disposed in a suitable housing 11 which also provides a confined space 12 between this bearing and the packing. An adjustable follower 13, secured to member 11 by the take-up bolts 14, is provided for compressing the packing material.

Members 10 and 11 are spaced a substantial distance apart and are connected by a tubular member or sleeve 15 extending lengthwise of and spaced from the shaft 4 and providing a confined zone 16 therebetween which communicates at its opposite ends with bearings 7 and 8.

Shaft 4 is drilled or otherwise provided at its lower end with a fluid passageway 17 through which communication is established between the space 16 within sleeve 15 and a confined space 18 provided within member 6 beneath the bearing 5 and at the lower end of the shaft, this space being in communication with bearing 5.

The device illustrated in Figure 1 is adapted to be disposed within a reactor, mixing tank or other desired vessel containing a body or pool of the fluids to be mixed or contacted, with the impeller 3 immersed in said pool or body and with all or a portion of member 11 disposed outside the vessel. Such an arrangement is illustrated in Figure 2 and will be later described.

Shaft 4 is connected at its upper end by well known means, not illustrated, with any suitable form of motivating means, such as an electric motor, fluid driven turbine or the like, not shown, and preferably a suitable outboard thrust bearing, indicated at 19 in Figure 2 and which in this instance is attached to member 11, is provided adjacent the upper end of the shaft. When desired, however, any of the bearings 5, 7 or 8 may be constructed and arranged to take the thrust of shaft 4 or a thrust-bearing may be provided within the confined space 18 of member 6, in which case shaft 4 will extend thereto and bear thereon and will be provided with lateral drilling, connecting the space 18 with the fluid passageway 17 in the shaft between the thrust bearing and bearing 5.

The construction illustrated provides protection for the bearings 5, 7 and 8, as well as packing 9, from contact with the corrosive and/or hot fluid being handled by impeller 3 and even when the mixing or reaction zone is operated at high pressure, the packing 9 need only serve to pack the shaft against relatively low pressure. To accomplish these desirable results, an auxiliary stream of fluid, which may be a portion or an ingredient of the mixture being handled by the impeller, is supplied to the space 16 within sleeve 15 through line 20 at a somewhat greater pressure than that maintained in the vessel within which the device is used. When high temperature is employed in the mixing zone, the fluid supplied to the device through line 20 is relatively cool and when the mixture handled by the impeller includes material of a corrosive nature, the fluid supplied through line 20 is of a non-corrosive or materially less corrosive nature. In some instances the material handled by impeller 3 is quite corrosive at high temperature but may be safely employed at low temperature as the fluid supplied through line 20.

Bearings 5, 7 and 8 are so fitted to shaft 4 that, under the pressure prevailing in zone 16, fluid supplied thereto through line 20 is forced between the bearings and the shaft. Fluid flows directly from zone 16 between bearing 7 and the shaft into the mixing zone above impeller 3 and another portion thereof flows through the fluid passageway 17 in shaft 4 into zone 18 within member 6 and therefrom between bearing 5 and the shaft into the mixing zone beneath the impeller. Another portion of the fluid from zone 16 flows directly therefrom between bearing 8 and the shaft into zone 12 provided within member 11 beneath packing 9, wherefrom it is discharged through line 21. Line 21 communicates with a zone of relatively low pressure as compared with that employed in zone 16 and also, when desired, as compared with that employed in the mixing zone, so that the pressure prevailing in zone 12 is relatively low and serves to materially decrease the pressure which would otherwise be exerted against packing 9. When desired, line 21 may communicate, for example, with a suitable atmospheric or low pressure storage tank, not illustrated, for the fluid supplied through line 20 to zone 16, in which case the fluid may of course be supplied to zone 16 by a suitable pump or compressor, not shown.

Referring now to Figure 2, a mixing or contacting device, such as illustrated in Figure 1, is disposed within a reactor or any other desired closed vessel 22 with member 6 mounted on and suitably secured to flange 23, which serves as a removable closure member at the lower end of the vessel, and with member 11 disposed outside the vessel and mounted on the upper man-way flange 24, which serves as a closure member at the upper end of the vessel. Sleeve 15 is preferably of suitable size and rigidity to serve as a brace for bearing 7, as well as a means of enclosing the shaft between members 10 and 11, although this bearing may be additionally braced and retained in alignment, when desired, by securing member 10 to the walls of the vessel 22 with suitable radial arms or the like, not illustrated.

One or more of the materials to be intimately mixed or contacted in vessel 22 is supplied thereto through line 25. The vessel may be maintained substantially full of the reacting mixture or a suitable liquid level may be maintained at any desired point above the impeller. The reactants are circulated by the impeller in the general manner illustrated by the arrows, whereby they are intimately commingled and wherein the desired reaction is accomplished. The size of the vessel and the rate of flow of the reactants thereto and resulting conversion products therefrom are regulated to give the desired reaction time in the vessel. The reaction products are discharged from the vessel through the outlet connection 26 to separating and recovery equipment of any suitable form, which is not pertinent to the present invention and therefore not illustrated.

When the reaction conducted within chamber 22 is of a strongly exothermic nature, as in the case of polymerization, alkylation and the like, one or more cooling coils or other tubular fluid conduits or the like, not illustrated, may be provided within the chamber in the path of flow of the mixture passing to and from the impeller and a cooling fluid is circulated through the coils to control the reaction temperature. A heating fluid may be substituted for the cooling fluid in case the reaction being conducted is of a strongly endothermic nature. The fluid supplied through line 20 to zone 16 of the mixing device and therefrom into the reacting mixture and through line 21, as previously described, may be one or more non-corrosive ingredients of the mixture or it may be any other fluid which will serve to protect the bearings and will not adversely affect the desired reaction when commingled in small amounts with the reacting mixture. A valve 27 is provided in line 20 to control the quantity of fluid supplied therethrough to zone 16 and, in case the fluid supplied to zone 16 is an ingredient of the mixture to be reacted and it is not desired to supply all of this ingredient to the mixing zone past the bearings, a line 28 and valve 29 are provided to connect line 20, on the upstream side of valve 27, with line 25, whereby a regulated portion of the material from line 20 may be supplied directly to the mixing zone.

In applying the features of the invention to a process for alkylating saturated hydrocarbons, such as isobutane, for example, with unsaturated hydrocarbons, such as butylenes, propylene or the like employing a corrosive alkylating agent, such as, for example, sulfuric acid or hydrogen fluoride, the saturated reactants and alkylating agent may be supplied directly to the mixing zone of chamber 22 through line 25, or a separate inlet line may be provided for the alkylating agent. All or a portion of the unsaturated reactants are supplied through line 20 and valve 27 to zone 16, another regulated portion thereof being supplied, when desired, through line 28 and valve 29 directly to the mixing zone. Alternatively, a regulated quantity of the total saturated and unsaturated hydrocarbon reactants may be supplied to the mixing zone through line 25 either alone or together with the alkylating agent, while another regulated portion of the hydrocarbon mixture, without the alkylating agent, is supplied to zone 16.

Since the alkylating reaction is of a highly exothermic nature, that portion of the reactants introduced directly to the mixing zone is preferably supplied thereto at a temperature suitable for conducting the alkylating reaction, this temperature varying with the materials to be alkylated and with the alkylating agent employed and the pressure utilized in the reaction zone. The material supplied to zone 16 and therefrom into the mixing zone is preferably at a temperature below that desired for conducting the reaction when the desired reaction temperature is above 100° F., or thereabouts, so that introduction of this material into the mixing zone, in the manner previously described, serves to control or at least assist in controlling the reaction temperature by counteracting or partially counteracting the heat evolved in the exothermic reaction. As previously mentioned, suitable cooling coils or the like may also be provided within the reaction zone, when desired.

In applying the features of the invention to the treatment of hydrocarbon distillates, such as cracked gasoline, for example, with corrosive treating agents, such as sulfuric acid, caustic soda, metal salts or the like, the treating agent, either alone or with a portion of the distillate may be supplied to the mixing zone of chamber 22 through line 25 and another portion of the distillate, without the treating agent, is supplied through line 20 to zone 16.

Any required pressure may be employed within chamber 22, ranging from sub-atmospheric to high superatmospheric pressure. In processes for the polymerization or alkylation of normally gaseous or light liquid hydrocarbons, a substantial superatmospheric pressure, sufficient to maintain the reactants in liquid phase or in dense phase resembling that of a liquid, is preferably employed in the reaction zone. On the other hand, the refining treatment of cracked distillates and other hydrocarbons is usually accomplished at substantially atmospheric pressure.

It will be apparent that at least some of the features of the invention may be employed to advantage regardless of the temperature and pressure utilized in the mixing or reaction zone when the mixture undergoing treatment therein contains materials of a corrosive nature. On the other hand, some of the features of the invention will be found advantageous regardless of the corrosive or non-corrosive nature of the material undergoing treatment when either high temperature or high pressure, or both, are employed in the mixing zone.

I claim:

1. In a process wherein a plurality of fluids are mixed in a closed receptacle by an impeller immersed in a mass of the fluids to be mixed and driven by a shaft journalled in bearing means therefor, at least one component of the mixture being corrosive and at least one other component thereof being relatively non-corrosive, the improved mode of operation which comprises providing about said shaft a confined space in communication with said bearing means, supplying said corrosive component directly to said mass within the receptacle and supplying at least a portion of the non-corrosive component to said confined space and then passing the same between said shaft and bearing into said mass.

2. In a process wherein fluid hydrocarbons are contacted and mixed with acidic fluid in a confined mixing zone and said mixing is accomplished with an impeller immersed in the body of fluids to be mixed and driven by a shaft journalled in a bearing, said shaft being packed against leakage from the mixing zone on that side of the bearing remote from the impeller, the improvement which comprises providing a confined space about said shaft between the bearing and the packing, supplying said acidic fluid directly to the mixing zone and supplying at least a portion of the fluid hydrocarbons to be contacted and mixed therewith to said confined space and therefrom between said shaft and bearing into the mixing zone, whereby to protect the bearing and packing from contact with said acidic fluid.

3. A process such as defined in claim 2, wherein said mixing is accompanied by an exothermic reaction and wherein the hydrocarbon fluid supplied to said confined space and therefrom into the mixing zone, as described, enters the mixing zone at a temperature below that desired for conducting said exothermic reaction, whereby to assist in controlling the temperature of the latter and maintain said bearing and packing relatively cool.

4. In a process wherein saturated and unsaturated hydrocarbons are alkylated with the aid of an acidic alkylating fluid in a confined mixing zone, wherein the fluid hydrocarbon reactants and alkylating agent are mixed by an impeller immersed in a body of said fluids and driven by a shaft journalled in a bearing, said shaft passing from the mixing zone on that side of the bearing remote from the impeller and being packed against leakage at this point, the improvement which comprises providing a confined space about said shaft between the bearing and packing, supplying said acidic fluid and at least a portion of the hydrocarbon reactants directly into said body of fluid in the mixing zone and supplying another portion of the hydrocarbon reactants to said confined space and therefrom between said shaft and bearing into the mixing zone, whereby to protect the bearing and packing from contact with said acidic fluid.

5. A process such as defined in claim 4, wherein the hydrocarbon fluid supplied to said confined space and therefrom into the mixing zone, as described, enters the latter at a temperature below that desired for conducting the alkylating reaction, whereby to assist in controlling the temperature of the latter and maintain said bearing and packing relatively cool.

LYMAN C. HUFF.